(12) United States Patent
O'Brien

(10) Patent No.: US 9,540,747 B2
(45) Date of Patent: Jan. 10, 2017

(54) COMPOSITION FOR PREPARING POLYSACCHARIDE FIBERS

(71) Applicant: E I DU PONT DE NEMOURS AND COMPANY, Wilmington, DE (US)

(72) Inventor: John P O'Brien, Oxford, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 90 days.

(21) Appl. No.: 14/688,801

(22) Filed: Apr. 16, 2015

(65) Prior Publication Data

US 2015/0225877 A1     Aug. 13, 2015

Related U.S. Application Data

(62) Division of application No. 13/479,990, filed on May 24, 2012, now Pat. No. 9,034,092.

(51) Int. Cl.

| | |
|---|---|
| *C08L 5/00* | (2006.01) |
| *C08B 37/02* | (2006.01) |
| *D01D 5/06* | (2006.01) |
| *D01F 9/00* | (2006.01) |
| *C08L 5/02* | (2006.01) |
| *D01F 11/00* | (2006.01) |

(52) U.S. Cl.
CPC ............. *D01D 5/06* (2013.01); *C08B 37/0021* (2013.01); *C08L 5/00* (2013.01); *C08L 5/02* (2013.01); *D01F 9/00* (2013.01); *D01F 11/00* (2013.01)

(58) Field of Classification Search
CPC .............. D01F 9/00; D01F 11/00; D01D 5/06; C08B 37/021; C08L 5/00; C08L 5/02
See application file for complete search history.

(56) References Cited

U.S. PATENT DOCUMENTS

| | | | |
|---|---|---|---|
| 4,306,059 A | 12/1981 | Yokobayashi et al. | |
| 4,501,886 A | 2/1985 | O'Brien | |
| 7,000,000 B1 | 2/2006 | O'Brien | |
| 8,642,757 B2 | 2/2014 | O'Brien et al. | |
| 8,828,689 B2 | 9/2014 | Caimi et al. | |
| 8,871,474 B2 | 10/2014 | Payne et al. | |
| 9,034,092 B2 * | 5/2015 | O'Brien ................... | D01D 5/06 106/205.9 |
| 2007/0275869 A1 | 11/2007 | Hoppe et al. | |
| 2013/0087938 A1 | 4/2013 | O'Brien et al. | |
| 2013/0161861 A1 | 6/2013 | O'Brien et al. | |

FOREIGN PATENT DOCUMENTS

WO        00/43580        7/2000

OTHER PUBLICATIONS

Le Moigne et al., Physics of Cellulose Xanthate Dissolution in Sodium Hydroxide-Water Mixtures: A Rheo-Optical Study, Cellulose Chem. Technol., 2010, 217-221, 44 (7-8).
Ogawa et al., Crystal Structure of (1-3)-a-D-Glucan, Fiber Diffraction Methods, 1980, 353-362, 47.
Simpson et al., Four glucosyltransferases, GtfJ, GtfK, GtfL and GtfM, from *Streptococcus salivarius* ATCC 25975, Microbiology, 1995, 1451-1460, 141.
PCT Search Report and Written Opinion for International application No. PCT/US2013/042329 dated Jul. 26, 2013.

* cited by examiner

*Primary Examiner* — David M Brunsman

(57) ABSTRACT

Solutions formed by combining poly($\alpha(1\rightarrow 3)$) glucan) with $CS_2$ in aqueous alkali metal hydroxide solution have been shown to produce the xanthated form of the poly($\alpha(1\rightarrow 3)$ glucan). The solutions so formed have been shown to be useful for solution spinning into fiber of poly($\alpha(1\rightarrow 3)$ glucan) when the spun fiber is coagulated in an acidic coagulation bath. The fibers so produced exhibit desirable physical properties. The poly($\alpha(1\rightarrow 3)$ glucan) employed was synthesized by fermentation.

8 Claims, 1 Drawing Sheet

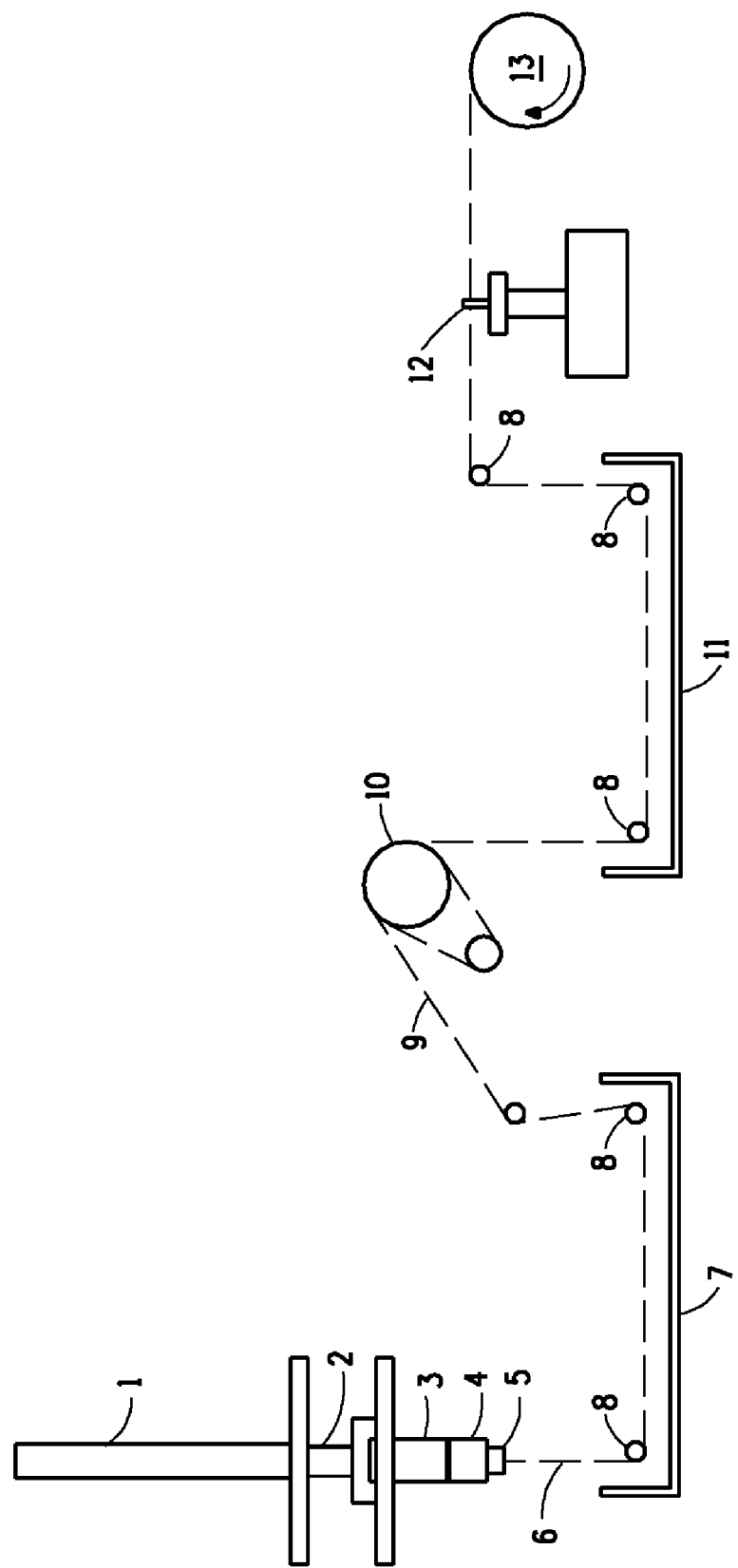

COMPOSITION FOR PREPARING POLYSACCHARIDE FIBERS

CROSS-REFERENCE TO RELATED APPLICATION

This application is a divisional of U.S. patent application Ser. No. 13/479,990 filed May 24, 2012 and entitled "Novel Composition for Preparing Polysaccharide Fibers" now U.S. Pat. No. 9,034,092, which application is incorporated herein in their entirety by reference thereto.

FIELD OF THE INVENTION

The present invention is directed to a process for forming fibers of poly($\alpha(1\rightarrow3)$ glucan) by solution spinning a solution of xanthated poly($\alpha(1\rightarrow3)$ glucan) in an aqueous alkali metal hydroxide and to the solution itself. The poly($\alpha(1\rightarrow3)$ glucan) employed was synthesized by fermentation.

BACKGROUND OF THE INVENTION

Polysaccharides have been known since the dawn of civilization, primarily in the form of cellulose, a polymer formed from glucose by natural processes via $\beta(1\rightarrow4)$ glycoside linkages; see, for example, *Applied Fibre Science*, F. Happey, Ed., Chapter 8, E. Atkins, Academic Press, New York, 1979. Numerous other polysaccharide polymers are also disclosed therein.

Only cellulose among the many known polysaccharides has achieved commercial prominence as a fiber. In particular, cotton, a highly pure form of naturally occurring cellulose, is well-known for its beneficial attributes in textile applications.

It is further known that cellulose exhibits sufficient chain extension and backbone rigidity in solution to form liquid crystalline solutions; see, for example O'Brien, U.S. Pat. No. 4,501,886. The teachings of the art suggest that sufficient polysaccharide chain extension could be achieved only in $\beta(1\rightarrow4)$ linked polysaccharides and that any significant deviation from that backbone geometry would lower the molecular aspect ratio below that required for the formation of an ordered phase.

More recently, glucan polymer, characterized by $\alpha(1\rightarrow3)$ glycoside linkages, has been isolated by contacting an aqueous solution of sucrose with GtfJ glucosyltransferase isolated from *Streptococcus salivarius*, Simpson et al., Microbiology, vol 141, pp. 1451-1460 (1995). Highly crystalline, highly oriented, low molecular weight films of $\alpha(1\rightarrow3)$-D-glucan have been fabricated for the purposes of x-ray diffraction analysis, Ogawa et al., Fiber Diffraction Methods, 47, pp. 353-362 (1980). In Ogawa, the insoluble glucan polymer is acetylated, the acetylated glucan dissolved to form a 5% solution in chloroform and the solution cast into a film. The film is then subjected to stretching in glycerine at 150° C. which orients the film and stretches it to a length 6.5 times the original length of the solution cast film. After stretching, the film is deacetylated and crystallized by annealing in superheated water at 140° C. in a pressure vessel. It is well-known in the art that exposure of polysaccharides to such a hot aqueous environment results in chain cleavage and loss of molecular weight, with concomitant degradation of mechanical properties.

Polysaccharides based on glucose and glucose itself are particularly important because of their prominent role in photosynthesis and metabolic processes. Cellulose and starch, both based on molecular chains of polyanhydroglucose are the most abundant polymers on earth and are of great commercial importance. Such polymers offer materials that are environmentally benign throughout their entire life cycle and are constructed from renewable energy and raw materials sources.

The term "glucan" is a term of art that refers to a polysaccharide comprising beta-D-glucose monomer units that are linked in eight possible ways. Cellulose is a glucan.

Within a glucan polymer, the repeating monomeric units can be linked in a variety of configurations following an enchainment pattern. The nature of the enchainment pattern depends, in part, on how the ring closes when an aldohexose ring closes to form a hemiacetal. The open chain form of glucose (an aldohexose) has four asymmetric centers (see below). Hence there are $2^4$ or 16 possible open chain forms of which D and L glucose are two. When the ring is closed, a new asymmetric center is created at C1 thus making 5 asymmetric carbons. Depending on how the ring closes, for glucose, $\alpha(1\rightarrow4)$-linked polymer, e.g. starch, or $\beta(1\rightarrow4)$-linked polymer, e.g. cellulose, can be formed upon further condensation to polymer. The configuration at C1 in the polymer determines whether it is an alpha or beta linked polymer, and the numbers in parenthesis following alpha or beta refer to the carbon atoms through which enchainment takes place.

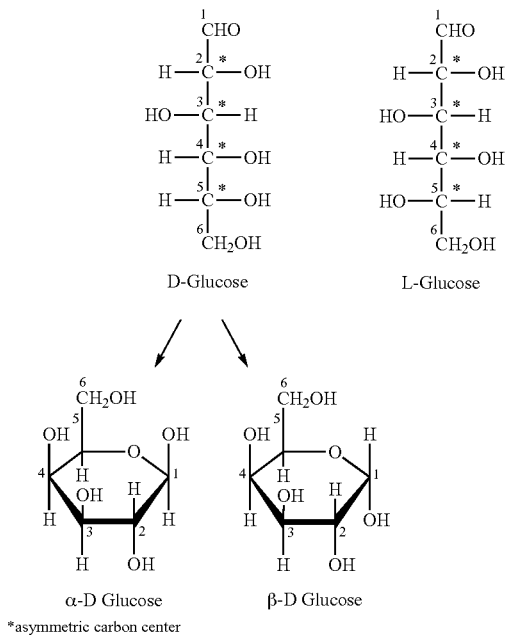

*asymmetric carbon center

The properties exhibited by a glucan polymer are determined by the enchainment pattern. For example, the very different properties of cellulose and starch are determined by the respective nature of their enchainment patterns. Starch or amylose consists of $\alpha(1\rightarrow4)$ linked glucose and does not form fibers among other things because it is swollen or dissolved by water. On the other hand, cellulose consists of $\beta(1\rightarrow4)$ linked glucose, and makes an excellent structural material being both crystalline and hydrophobic, and is commonly used for textile applications as cotton fiber, as well as for structures in the form of wood.

Like other natural fibers, cotton has evolved under constraints wherein the polysaccharide structure and physical properties have not been optimized for textile uses. In particular, cotton fiber is of short fiber length, limited variation in cross section and fiber fineness and is produced in a highly labor and land intensive process.

O'Brien, U.S. Pat. No. 7,000,000 discloses a process for preparing fiber from liquid crystalline solutions of acetylated poly(α(1→3) glucan). The thus prepared fiber was then de-acetylated resulting in a fiber of poly(α(1→3) glucan).

SUMMARY OF THE INVENTION

Considerable benefit accrues to the process hereof that provides a highly oriented and crystalline poly(α(1→3) glucan) fiber without sacrifice of molecular weight by the solution spinning of fiber from the novel solution hereof.

In one aspect the present invention is directed to a solution comprising 0.75 to 2 molar aqueous alkali metal hydroxide and a solids content of 5 to 20% by weight of xanthated poly(α(1→3) glucan); wherein the number average molecular weight of the xanthated poly(α(1→3) glucan) is at least 10,000 Daltons; and, wherein the degree of xanthation of the xanthated poly(α(1→3) glucan) lies in the range of 0.1 to 1.

In another aspect, the present invention is directed to a process comprising forming a solution by dissolving in a 0.75 to 2 molar aqueous alkali metal hydroxide, $CS_2$, and 5 to 20 percent by weight of the total weight of the resulting solution of poly(α(1→3) glucan) characterized by a number average molecular weight of at least 10,000 Da, causing said solution to flow through a spinneret, forming a fiber thereby; and contacting said fiber with an acidic liquid coagulant; wherein said process the weight ratio of $CS_2$ to poly(α(1→3) glucan) lies in the range of 0.1 to 1.0.

BRIEF DESCRIPTION OF THE DRAWING

FIG. 1 is a schematic diagram of an apparatus suitable for air gap or wet spinning of the aqueous alkali metal hydroxide solutions of PAGX hereof.

DETAILED DESCRIPTION

When a range of values is provided herein, it is intended to encompass the end-points of the range unless specifically stated otherwise. Numerical values used herein have the precision of the number of significant figures provided, following the standard protocol in chemistry for significant figures as outlined in ASTM E29-08 Section 6. For example, the number 40 encompasses a range from 35.0 to 44.9, whereas the number 40.0 encompasses a range from 39.50 to 40.49.

The term "solids content" is a term of art. It is used herein to refer to the percentage by weight of xanthated poly(α(1→3) glucan) (PAGX) in the aqueous alkali metal hydroxide solution hereof (MOH (aq). It is calculated from the formula:

$$SC = \frac{Wt(PAGX)}{Wt(PAGX) + Wt(MOH(aq))} \times 100$$

where SC represents "solids content," and Wt(PAGX), Wt(MOH(aq)) are respectively weights of the poly(α(1→3) glucan) xanthate (PAGX), and of the aqueous alkali metal hydroxide. The term "solids content" is synonymous with the concentration by weight of xanthated poly(α(1→3) glucan) with respect to the total weight of solution.

Percent by weight is represented by the term "wt-%."

The formula "MOH" shall be employed to refer to the alkali metal hydroxide suitable for the practice of the invention. The formula "MOH(aq)" shall be employed to refer to the aqueous alkali metal hydroxide solution suitable for the practice of the invention. It shall be understood that the expression "concentration of the MOH(aq)" shall refer to the molarity of the aqueous alkali metal hydroxide solution hereof.

A polymer, including glucan, and poly(α(1→3) glucan) (PAG) in particular, is made up of a plurality of so-called repeat units covalently linked to one another. The repeat units in a polymer chain are diradicals, the radical form providing the chemical bonding between repeat units. For the purposes of the present invention the term "glucose repeat units" shall refer to the diradical form of glucose that is linked to other diradicals in the polymer chain, thereby forming said polymer chain.

The term "glucan" refers to polymers, including oligomers and low molecular weight polymers that are unsuitable for fiber formation. For the purposes of the present invention, the glucan polymer suitable for the practice of the invention is a poly(α(1→3) glucan) or xanthated poly(α(1→3) glucan), characterized by a number average molecular weight of at least 10,000 Daltons, preferably of at least 40,000-100,000 Daltons.

Suitable PAGX is characterized by a degree of xanthation in the range of 0.1 to 1. The term "xanthation" is a term of art referring to the reaction of a hydroxyl group with $CS_2$ in alkali metal hydroxide, according to the following reaction:

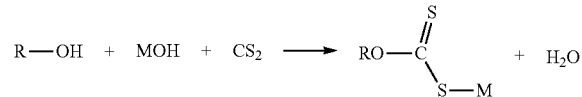

In the case of the PAG suitable for use in the process of the invention, each cyclic hexose repeat unit offers three hydroxyls for potential reaction to form the xanthate according to the above reaction scheme. The term "degree of xanthation" refers to the average percentage of available hydroxyl sites in each repeat unit that have actually undergone reaction to the xanthate. The theoretical maximum degree of xanthation a suitable PAG polymer molecule can undergo is 3—that is, every single hydroxyl site in the polymer would have undergone reaction.

According to the present invention, suitable PAGX polymers have undergone xanthation to the degree of 0.1 to 1. This means that on the average between one hydroxyl site per ten repeat units, and 10 hydroxyl sites per ten repeat units have undergone the xanthation reaction, while the theoretical maximum would be 30 hydroxyl sites per ten repeat units.

In one aspect the present invention is directed to a solution comprising 0.75 to 2 molar aqueous alkali metal hydroxide and a solids content of 5 to 20% by weight of PAGX; wherein the number average molecular weight of the PAGX is at least 10,000 Daltons; and, wherein the degress of xanthation of the PAGX lies in the range of 0.1 to 1.

In one embodiment, the alkali metal hydroxide (MOH) is sodium hydroxide. In a further embodiment the concentration of the NaOH is in the range of 1.0 to 1.7 M.

In one embodiment, the solids concentration is in the range of 7.5 to 15%.

The PAG suitable for use in the process of the present invention is a glucan characterized by a number average molecular weight ($M_n$) of at least 10,000 Da wherein at least 90 mol-% of the repeat units in the polymer are glucose repeat units and at least 50% of the linkages between glucose repeat units are α(1→3) glycoside linkages. Preferably at least 95 mol-%, most preferably 100 mol-%, of the repeat units are glucose repeat units. Preferably at least 90%, most preferably 100%, of the linkages between glucose units are α(1→3) glycoside linkages.

The isolation and purification of various polysaccharides is described in, for example, *The Polysaccharides*, G. O. Aspinall, Vol. 1, Chap. 2, Academic Press, New York, 1983. Any means for producing the α(1→3) polysaccharide suitable for the invention in satisfactory yield and 90% purity is suitable. In one such method, disclosed in U.S. Pat. No. 7,000,000, poly(α(1→3)-D-glucose) is formed by contacting an aqueous solution of sucrose with gtfJ glucosyltransferase isolated from *Streptococcus salivarius* according to the methods taught in the art. In an alternative such method, the gtfJ is generated by genetically modified *E. Coli*, as described in detail, infra.

The PAG suitable for use in the present invention can further comprise repeat units linked by a glycoside linkage other than α(1→3), including α(1→4), α(1→6), β(1→2), β(1→3), β(1→4) or β(1→6) or any combination thereof. According to the present invention, at least 50% of the glycoside linkages in the polymer are α(1→3) glycoside linkages. Preferably at least 90%, most preferably 100%, of the linkages between glucose units are α(1→3) glycoside linkages.

The solution hereof is prepared by adding a suitable PAG to MOH(aq), containing carbon disulfide and agitating to obtain thorough mixing. PAGX is formed in situ under these conditions. The solids content of PAGX in the solution ranges from 5 to 20% by weight with respect to the total weight of the solution. When solids content of PAGX is below 5%, the fiber-forming capability of the solution is greatly degraded. Solutions with solids content above 15% are increasingly problematical to form, requiring increasingly refined solution forming techniques.

In any given embodiment, the solubility limit of PAGX is a function of the molecular weight of the PAGX, the concentration of the MOH(aq), the degree of xanthation, the duration of mixing, the viscosity of the solution as it is being formed, the shear forces to which the solution is subject, and the temperature at which mixing takes place. Generally, higher shear mixing and higher temperature will be associated with higher solubility. The maximum temperature for mixing is limited 46° C., the boiling point of the $CS_2$. From the standpoint of solubility and spinnability, the optimum concentrations of the MOH(aq) and $CS_2$ may change depending upon the other parameters in the mixing process.

In the practice of the invention, it has been observed that the reaction of the $CS_2$ with the PAG to form the xanthate occurs quantitatively within about one to three hours at room temperature. The xanthate so formed has also been observed to be chemically unstable, degrading completely into a variety of by-products after approximately 36 hours of solution time. It is therefore incumbent upon the practitioner hereof to employ the solution hereof for fiber spinning after the time required for formation of the xanthate but before significant degradation can occur. For a solution hereof prepared at room temperature, spinning is thus performed preferably between 1 to 3 hours of solution time, depending upon the reaction time for xanthate formation. The term "solution time" refers to the time elapsed from when the ingredients of the solution are first combined. Thus, in a preferred embodiment of the process hereof, the ingredients are combined, allowed to stand for 1 to 3 hours, and then spun into fiber as described in detail, infra. In a somewhat less preferred embodiment chemically, but more preferred from a practical viewpoint, a solution time on the order of 1-5 hours is also suitable.

The present invention is further directed to a process comprising forming a solution by dissolving in a 0.75 to 2 molar aqueous alkali metal hydroxide, $CS_2$, and 5 to 15 percent by weight of the total weight of the resulting solution of PAG characterized by a number average molecular weight of at least 10,000 Da; causing said solution to flow through a spinneret, forming a fiber thereby; and, contacting said fiber with an acidic liquid coagulant; wherein said process the weight ratio of $CS_2$ to PAG lies in the range of 0.1 to 1.0.

In one embodiment, the alkali metal (M) is sodium.

In a further embodiment of the process hereof, a suitable PAG is one wherein 100% of the repeat units are glucose, and 100% of the linkages between glucose repeat units are α(1→3) glycoside linkages.

In the process hereof, the minimum solids content of PAGX required in the solution in order to achieve stable fiber formation varies according to the molecular weight of the PAGX, as well as the degree of xanthation. It is found in the practice of the invention that a 5% solids content is an approximate lower limit to the concentration needed for stable fiber formation. At >15%, especially greater than 20% solids, excessive amounts of undissolved PAGX are present, causing a degradation in fiber spinning performance. A solution having a solids content of at least 7.5% is preferred. A solids content ranging from about 7.5% to about 15% in a 1.0 to 1.7 M NaOH solution is more preferred. Preferred is a PAGX characterized by a number average molecular weight in the range of 40,000-100,000 Daltons and degree of xanthation in the range of 0.1-1.

Spinning from the solution hereof can be accomplished by means known in the art, and as described in O'Brien, op. cit. The viscous spinning solution can be forced by means such as the push of a piston or the action of a pump through a single or multi-holed spinneret or other form of die. The spinneret holes can be of any cross-sectional shape, including round, flat, multi-lobal, and the like, as are known in the art. The extruded strand can then be passed by ordinary means into a coagulation bath wherein is contained a liquid coagulant which converts the PAGX back to PAG, causing the polymer to coagulate into a fiber according to the present invention.

Suitable liquid coagulants include but are not limited to glacial acetic acid, aqueous acetic acid, sulfuric acid, combinations of sulfuric acid, sodium sulfate, and zinc sulfate. In one embodiment, the liquid coagulant is maintained at a temperature in the range of 0-100° C., and preferably in the range of 15-70° C.

In one embodiment, the coagulation bath comprises glacial acetic acid. It is found in the practice of the invention that satisfactory results are achieved by employing as the coagulant liquid an excess of glacial acetic acid. During the course of spinning, the glacial acetic acid neutralizes aqueous NaOH and regenerates PAG from PAGX as the spun fiber passes through the coagulant bath.

In a preferred embodiment, extrusion is effected directly into the coagulation bath. In such a circumstance, known in the art as "wet-spinning," the spinneret is partially or fully immersed in the coagulation bath. The spinnerets and associated fittings should be constructed of corrosion resistant alloys such as stainless steel or platinum/gold.

In one embodiment, the thus coagulated fiber is then passed into a second bath provided to neutralize and dilute residual acid from the coagulation bath. The secondary bath preferably contains $H_2O$, methanol, or 5% aqueous $NaHCO_3$, or a mixture thereof. Aqueous $NaHCO_3$ is preferred. In an embodiment, the wound fiber package is soaked in one or more neutralizing wash baths for a period of time up to four hours in each bath. A sequence of baths comprising respectively 5% aqueous $NaHCO_3$, methanol, and $H_2O$, has been found satisfactory.

The invention hereof is further described in, but not limited by, the following specific embodiments thereof.

EXAMPLES

Preparation of Glucosyltransferase (GtfJ) Enzyme

Materials

Dialysis tubing (Spectrapor 25225-226, 12000 molecular weight cut-off) was obtained from VWR (Radnor, Pa.).

Dextran and ethanol were obtained from Sigma Aldrich. Sucrose was obtained from VWR.

Suppressor 7153 antifoam was obtained from Cognis Corporation (Cincinnati, Ohio).

All other chemicals were obtained from commonly used suppliers.

Seed Medium

The seed medium, used to grow the starter cultures for the fermenters, contained: yeast extract (Amberx 695, 5.0 grams per liter (g/L)), $K_2HPO_4$ (10.0 g/L), $KH_2PO_4$ (7.0 g/L), sodium citrate dihydrate (1.0 g/L), $(NH_4)_2SO_4$ (4.0 g/L), $MgSO_4$ heptahydrate (1.0 g/L) and ferric ammonium citrate (0.10 g/L). The pH of the medium was adjusted to 6.8 using either 5N NaOH or $H_2SO_4$ and the medium was sterilized in the flask. Post sterilization additions included glucose (20 mL/L of a 50% w/w solution) and ampicillin (4 mL/L of a 25 mg/mL stock solution).

Fermenter Medium

The growth medium used in the fermenter contained: $KH_2PO_4$ (3.50 g/L), $FeSO_4$ heptahydrate (0.05 g/L), $MgSO_4$ heptahydrate (2.0 g/L), sodium citrate dihydrate (1.90 g/L), yeast extract (Ambrex 695, 5.0 g/L), Suppressor 7153 antifoam (0.25 milliliters per liter, mL/L), NaCl (1.0 g/L), $CaCl_2$ dihydrate (10 g/L), and NIT trace elements solution (10 mL/L). The NIT trace elements solution contained citric acid monohydrate (10 g/L), $MnSO_4$ hydrate (2 g/L), NaCl (2 g/L), $FeSO_4$ heptahydrate (0.5 g/L), $ZnSO_4$ heptahydrate (0.2 g/L), $CuSO_4$ pentahydrate (0.02 g/L) and $NaMoO_4$ dihydrate (0.02 g/L). Post sterilization additions included glucose (12.5 g/L of a 50% w/w solution) and ampicillin (4 mL/L of a 25 mg/mL stock solution).

Construction of Glucosyltransferase (gtfJ) Enzyme Expression Strain

A gene encoding the mature glucosyltransferase enzyme (GtfJ; EC 2.4.1.5; GENBANK® AAA26896.1, SEQ ID NO: 3) from *Streptococcus salivarius* (ATCC 25975) was synthesized using codons optimized for expression in *E. coli* (DNA 2.0, Menlo Park Calif.). The nucleic acid product (SEQ ID NO: 1) was subcloned into pJexpress404® (DNA 2.0, Menlo Park Calif.) to generate the plasmid identified as pMP52 (SEQ ID NO: 2). The plasmid pMP52 was used to transform *E. coli* MG1655 (ATCC 47076) to generate the strain identified as MG1655/pMP52.

Standard recombinant DNA and molecular cloning techniques used herein are well known in the art and are described by Sambrook, J. and Russell, D., *Molecular Cloning: A Laboratory Manual*, Third Edition, Cold Spring Harbor Laboratory Press, Cold Spring Harbor, N.Y. (2001); and by Silhavy, T. J., Bennan, M. L. and Enquist, L. W., *Experiments with Gene Fusions*, Cold Spring Harbor Laboratory Press, Cold Spring Harbor, NY (1984); and by Ausubel, F. M. et. al., *Short Protocols in Molecular Biology*, 5th Ed. Current Protocols, John Wiley and Sons, Inc., N.Y., 2002.

Materials and methods suitable for the maintenance and growth of microbial cultures are well known in the art. Techniques suitable for use in the following examples may be found as set out in *Manual of Methods for General Bacteriology* (Phillipp Gerhardt, R. G. E. Murray, Ralph N. Costilow, Eugene W. Nester, Willis A. Wood, Noel R. Krieg and G. Briggs Phillips, Eds.), American Society for Microbiology: Washington, D.C. (1994)); or in *Manual of Industrial Microbiology and Biotechnology*, 3rd Edition (Richard H. Baltz, Julian E. Davies, and Arnold L. Demain Eds.), ASM Press, Washington, D.C., 2010.

Production of Recombinant gtfJ in Fermentation

Production of the recombinant gtfJ enzyme in a fermenter was initiated by expressing the gtfJ enzyme, constructed as described supra. A 10 mL aliquot of the seed medium was added into a 125 mL disposable baffled flask and was inoculated with a 1.0 mL culture of the *E. coli* MG1655/pMP52 prepared supra, in 20% glycerol. This culture was allowed to grow at 37° C. while shaking at 300 revolutions per minute (rpm) for 3 hours.

A seed culture, for starting the fermenter, was prepared by charging a 2 L shake flask with 0.5 L of the seed medium. 1.0 mL of the pre-seed culture was aseptically transferred into 0.5 L seed medium in the flask and cultivated at 37° C. and 300 rpm for 5 hours. The seed culture was transferred at optical density 550 nm $(OD_{550})$>2 to a 14 L fermenter (Braun, Perth Amboy, N.J.) containing 8 L of the fermenter medium described above at 37° C.

Cells of *E. coli* MG1655/pMP52 were allowed to grow in the fermenter and glucose feed (50% w/w glucose solution containing 1% w/w $MgSO_4.7H_2O$) was initiated when glucose concentration in the medium decreased to 0.5 g/L. The feed was started at 0.36 grams feed per minute (g feed/min) and increased progressively each hour to 0.42, 0.49, 0.57, 0.66, 0.77, 0.90, 1.04, 1.21, 1.41 1.63, 1.92, 2.2 g feed/min respectively. The rate was held constant afterwards by decreasing or temporarily stopping the glucose feed when glucose concentration exceeded 0.1 g/L. Glucose concentration in the medium was monitored using a YSI glucose analyzer (YSI, Yellow Springs, Ohio).

Induction of glucosyltransferase enzyme activity was initiated, when cells reached an $OD_{550}$ of 70, with the addition of 9 mL of 0.5 M IPTG (isopropyl β-D-1-thiogalacto-pyranoside). The dissolved oxygen (DO) concentration was controlled at 25% of air saturation. The DO was controlled first by impeller agitation rate (400 to 1200 rpm) and later by aeration rate (2 to 10 standard liters per minute, slpm). The pH was controlled at 6.8. $NH_4OH$ (14.5% weight/volume, w/v) and $H_2SO_4$ (20% w/v) were used for pH control. The back pressure was maintained at 0.5 bars. At various intervals (20, 25 and 30 hours), 5 mL of Suppressor 7153 antifoam was added into the fermenter to suppress foaming. Cells were harvested by centrifugation 8 hours post IPTG addition and were stored at −80° C. as a cell paste.

Preparation of gtfJ Crude Enzyme Extract from Cell Paste

The cell paste obtained above was suspended at 150 g/L in 50 mM potassium phosphate buffer pH 7.2 to prepare a slurry. The slurry was homogenized at 12,000 psi (Rannie-type machine, APV-1000 or APV 16.56) and the homogenate chilled to 4° C. With moderately vigorous stirring, 50 g of a floc solution (Aldrich no. 409138, 5% in 50 mM sodium phosphate buffer pH 7.0) was added per liter of cell homogenate. Agitation was reduced to light stirring for 15 minutes. The cell homogenate was then clarified by centrifugation at 4500 rpm for 3 hours at 5-10° C. Supernatant, containing crude gtfJ enzyme extract, was concentrated (approximately 5×) with a 30 kilo Dalton (kDa) cut-off membrane. The concentration of protein in the gftJ enzyme solution was determined by the bicinchoninic acid (BCA) protein assay (Sigma Aldrich) to be 4-8 g/L.

Preparation of Polymer, Spinning Solutions, and Fiber

Spinning Apparatus and Procedure

FIG. 1 is a schematic diagram of an apparatus suitable for use in the fiber spinning process hereof. The worm gear drive, 1, drives a ram, 2, at a controlled rate onto a piston fitted into a spinning cell, 3. The spinning cell may contain filter assemblies. A suitable filter assembly includes 100 and 325 mesh stainless steel screens. A spin pack, 4, contains the spinneret, 5, and optionally stainless steel screens as prefilters for the spinneret. The extruded filament, 6, produced therefrom is directed into a liquid coagulation bath, 7. In all the examples listed in Table 1, the filament was extruded from the spinneret directly into the liquid coagulation bath—the bottom of the spinneret was immersed in the bath.

The extrudate can be, but need not be, directed back and forth through the bath between guides, 8, which are normally fabricated of Teflon® PTFE. Only one pass through the bath is shown in FIG. 1. On exiting the coagulation bath, 7, the thus quenched filament, 9, can optionally be directed through a drawing zone using an independently driven roll, 10, around which the thus quenched filament is wrapped. The quenched filament may optionally be directed through a draw bath, 11, that allows further treatment such as additional solvent extraction, washing or drawing of the extruded filaments. The thus prepared filament is then directed through a traversing mechanism, 12, to evenly distribute the fiber on the bobbin, and collected on plastic bobbins using a wind up, 13. In one embodiment, the process comprises a plurality of independently driven rolls.

In one embodiment, the driven roll, 10, is removed from the fiber pathway, but the fiber is nevertheless immersed in the draw bath. The two are independent of each other. In all of the examples, infra, the driven roll, 10, was removed from the fiber pathway.

In one embodiment, a plurality of filaments is extruded through a multi-hole spinneret, and the filaments so produced are converged to form a yarn. In a further embodiment, the process further comprises a plurality of multi-hole spinnerets so that a plurality of yarns can be prepared simultaneously.

In each example, the wound bobbin of fiber produced was soaked overnight in a bucket of the liquid indicated in Table 1. The thus soaked bobbin of fiber was then air dried for at least 24 hours. The fiber tensile properties were then determined according to ASTM D2101-82.

The spin cell, the piston, the connecting tubing and the spinneret were all constructed of stainless steel.

Fiber Physical Property Measurement.

Physical properties such as tenacity, elongation and initial modulus were measured using methods and instruments conforming to ASTM Standard D 2101-82, except that the test specimen length was 10 inches. Reported results are averages for 3 to 5 individual yarn tests.

The physical properties were determined for every fiber prepared. The results are shown in Table 1. Included are the denier of the fiber produced, and the physical properties such as tenacity (T) in grams per denier (gpd), elongation to break (E, %), and initial modulus (M) in gpd.

Glossary Of Terms

| Column Label | Actual Term | Explanation |
|---|---|---|
| Jet Vel. (fpm) | Jet Velocity | The linear speed of the fiber at the exit from the spinneret. |
| fpm | Feet per minute | |
| Coag. Temp. | Coagulation Temperature | |
| NA | Not Applicable | The parameter does not apply to this example. |
| NT | Not Tested | |
| S.S.F. | Spin Stretch Factor | S.S.F. = (wind-up speed)/(jet vel.) |
| MeOH | Methanol | |

Materials

| Ingredient | Stock No. | Source |
|---|---|---|
| Sucrose | BDH8029 | VWR |
| Glucose | G7528 | Sigma-Aldrich |
| Dextran T-10 | D9260 | Sigma-Aldrich |
| Boric Acid | B6768 | Sigma-Aldrich |
| NaOH | SX0590-1 | EMD |

Example 1

Preparation of Polymer P1

Twenty liters of an aqueous solution was prepared by combining 1000 g of sucrose (VWR #BDH8029), 20 g Dextran T-10 (Sigma #D9260), and 370.98 g Boric Acid (Sigma #B6768) were combined in about 18 l of water. 4N NaOH (EMD #SX0590-1) solution was employed to adjust the pH to 7.5. Additional water was then added to bring the total volume up to 20 l. The thus prepared solution was then charged with 180 ml of the enzyme extract prepared supra and allowed to stand at ambient temperature for 48 hours. The resulting poly($\alpha(1\rightarrow3)$ glucan) solids were collected on a Büchner funnel using a 325 mesh screen over 40 micrometer filter paper. The filter cake was washed with deionized water and filtered as above. The deionized water wash was repeated three additional times. Finally two additional washes with methanol were carried out; the filter cake was pressed out on the funnel and dried in vacuum at room temperature. Yield: 237.68 grams of white flaky solids.

Molecular weights were determined by size exclusion chromatography (SEC) with a GPCV/LS 2000™ (Waters Corporation, Milford, Mass.) chromatograph equipped with two Zorbax PSM Bimodal-s silica columns (Agilent, Wilmington, Del.), using DMAc from J.T Baker, Phillipsburg, N.J. with 3.0% LiCl (Aldrich, Milwaukee, Wis.) as the mobile phase. Samples were dissolved in DMAc with 5.0% LiCl. Number and weight average molecular weights (Mn and Mw) were found to be 139,000 and 279,000 Daltons respectively.

Example 1

Spinning Solution

A 250 mL wide mouth glass bottle was charged with 25 g of polymer P1 and 225 g of 5 wt % sodium hydroxide.

$CS_2$, (7.5 g), was then added via a syringe. The container was fitted with a cap and a septum through which a polypropylene stirring rod had been fitted. The contents were manually mixed with the stirring rod and then allowed to stand at room temperature overnight. The following day the partially dissolved solution (clear but containing a small amount of visible particulate) was transferred into a spin cell and piston containing screen packs including 100 and 325 mesh stainless steel screens. A piston was fitted over the viscous mixture. The mixture was then pumped back and forth through 13 cycles using a motorized worm gear driven ram into an identically equipped spinning cell coupled head to head with the first cell via a coupler fabricated from ¼ inch stainless steel tubing.

Examples 2-4

Fiber Spinning

Approximately 20 hours after the preparation of the solution of Example 1, the solution thus prepared was fed to the spinning apparatus, as described, supra, referring to FIG. 1. The solution was fed to a 20 hole spinneret wherein each hole was characterized by a circular cross-section, a diameter of 0.003 in and a length of 0.006 in. Table 1 provides the spinning conditions that were used for the fibers prepared in Examples 2-4. The apparatus depicted in FIG. 1, as described supra, was modified by removal of the driven roll, 10, from the filament pathway in Examples 1-3. The indicated spin stretch was attained by running the windup faster than the jet velocity. The solution of Example 1 was metered at the rates shown in Table 1 through a spin pack having a filter assembly consisting of 100 and 325 mesh screens to the spinneret. The spinneret was immersed into a water coagulation bath containing, by weight, 8% $H_2SO_4$, 23% $Na_2SO_4$, and 0.5% $ZnSO_4$ The filament was extruded directly into the quench bath vertically at the temperature indicated in Table 1. Additional residence time in the 6 foot long coagulation bath was increased by directing the fiber over additional guide pins (8) for a total immersion distance of 4.1 or 11 ft. as indicated. In Examples 2 and 3, upon removal from the coagulation bath the thus coagulated filaments was directed to a speed controlled wind-up with a traversing guide, at wind-up speeds shown in Table 1. In Example 4 the coagulated filaments were directed to a second bath of methanol for the length and at the temperature indicated in Table 1. In each example, several hundred feel of fiber were wound onto a bobbin. Following wind-up, the fiber bobbins of Examples 2-4, were soaked sequentially respectively in 5% NaHCO3, MeOH, and $H_2O$ baths for a period of about 4 hours in each. The fiber was allowed to air dry before being subject to physical measurements Physical properties were determined; results are shown in Table 1.

TABLE 1

| EXAMPLE | POLYMER REF. | % GLUCAN SOLIDS | PUMP RATE (ml/min) | JET VEL (fpm) | COAGULATION/BATH COMPOSITION | LENGTH (ft) | T (° C.) | SECOND BATH COMPOSITION | LENGTH (ft) | T (° C.) | WIND-UP SPEED (fpm) | S.S.F. | T (gpd) | E (%) | M (gpd) | DENIER |
|---|---|---|---|---|---|---|---|---|---|---|---|---|---|---|---|---|
| 2 | P1 | 9.7 | 1.60 | 56 | 8% H$_2$SO$_4$ 23% Na$_2$SO$_4$ 0.5% ZnSO$_4$ | 11 | 51 | NA | NA | NA | 126 | 2.3 | 1.0 | 3.7 | 60.2 | 40 |
| 3 | P1 | 9.7 | 1.60 | 56 | 8% H$_2$SO$_4$ 23% Na$_2$SO$_4$ 0.5% ZnSO$_4$ | 11 | 51 | NA | NA | NA | 100 | 2.3 | 1.2 | 4.9 | 60.5 | 75 |
| 4 | P1 | 9.7 | 1.60 | 56 | 8% H$_2$SO$_4$ 23% Na$_2$SO$_4$ 0.5% ZnSO$_4$ | 4.1 | 51 | MeOH | 2.25 | 17 | 63 | 1.1 | 1.1 | 6.8 | 52.8 | 80.0 |
| 6 | P2 | 7.3 | 1.50 | 55 | 5% H$_2$SO$_4$ | 3 | 21 | NA | NA | NA | 61 | 1.1 | 1.0 | 3.8 | 65.6 | 55 |
| 7 | P2 | 7.3 | 1.50 | 55 | 5% H$_2$SO$_4$ | 3 | 21 | MeOH | 2.00 | 21 | 61 | 1.1 | 0.9 | 4.5 | 48.2 | 75 |
| 8 | P2 | 7.3 | 1.50 | 55 | 5% H$_2$SO$_4$ | 3 | 22 | MeOH | 2.00 | 23 | 82 | 1.5 | 1.1 | 4.2 | 64.6 | 47 |
| 9 | P2 | 7.3 | 1.50 | 55 | 5% H$_2$SO$_4$ | 3 | 24 | MeOH | 0.50 | 24 | 104 | 1.9 | 1.0 | 2.8 | 60.4 | 42 |
| 10 | P2 | 7.3 | 1.50 | 55 | Glacial Acetic | 4.3 | 25 | MeOH | 1.80 | 26 | 57 | 1.0 | 1.2 | 5.4 | 70.4 | 60 |
| 11 | P2 | 7.3 | 1.50 | 55 | 50/50 Acetic acid/H$_2$O v/v | 4.3 | 25 | MeOH | 1.80 | 26 | 56 | 1.0 | 1.0 | 2.5 | 62.7 | 70.0 |
| 13 | P2 | 9.85 | 1.50 | 55 | 5% H$_2$SO$_4$ | 4 | 24 | NA | NA | NA | 50 | 0.9 | 0.8 | 3.7 | 50.7 | 115 |
| 14 | P2 | 9.85 | 1.50 | 55 | 5% H$_2$SO$_4$ | 3.5 | 24 | MeOH | 1.15 | 25 | 60 | 1.1 | 1.3 | 4.7 | 71.4 | 75 |
| 15 | P2 | 9.85 | 1.50 | 55 | 5% H$_2$SO$_4$ | 3 | 24 | MeOH | 1.30 | 26 | 80 | 1.5 | 1.1 | 3.8 | 73.2 | 60 |
| 17 | P2 | 7.33 | 2.10 | 75 | 5% H$_2$SO$_4$ | 4.3 | 12 | NA | NA | NA | 72 | 1.0 | 1.3 | 5.1 | 81 | 75 |
| 18 | P2 | 7.33 | 2.10 | 75 | 5% H2SO4 | 4.3 | 15 | MeOH | 1.5 | 17 | 72 | 1.0 | 1.3 | N/A | N/A | N/A |
| 19 | P2 | 7.33 | 2.10 | 75 | 5% H2SO4 | 4.3 | 16 | MeOH | 1.5 | 16 | 89 | 1.2 | N/A | N/A | N/A | N/A |
| 20 | P3 | 7.33 | 1.60 | 50 | 10% H2SO4 | 4.3 | 17 | NA | NA | NA | 76 | 1.5 | 1.7 | 4.4 | 102 | 45 |
| 21 | P3 | 7.33 | 1.60 | 50 | 10% H2SO4 | 4.3 | 18 | NA | NA | NA | 100 | 2.0 | N/A | N/A | N/A | N/A |
| 22 | P3 | 7.33 | 1.60 | 50 | 10% H2SO4 | 4.3 | 18 | MeOH | 1.9 | 13 | 62 | 1.2 | N/A | N/A | N/A | N/A |
| 23 | P3 | 7.33 | 1.60 | 50 | 10% H2SO4 | 4.3 | 19 | H2O | 1.66 | 45 | 33 | 0.7 | 1.8 | 5.3 | 85 | 115 |
| 25 | P3 | 13 | 1.28 | 45 | 10% H2SO4 | 4.2 | 24 | NA | NA | NA | 51 | 1.1 | N/A | N/A | N/A | N/A |
| 26 | P3 | 13 | 1.28 | 45 | 10% H2SO4 | 4.2 | 22 | H2O | 1.83 | 80 | 27 | 0.6 | N/A | N/A | N/A | N/A |
| 27 | P3 | 13 | 1.28 | 45 | 10% H2SO4 | 4.2 | 22 | H2O | 1.83 | 80 | 50 | 1.1 | N/A | N/A | N/A | N/A |
| 28 | P3 | 13 | 1.28 | 45 | 10% H2SO4 | 4.2 | 21 | NA | NA | NA | 72 | 1.6 | N/A | N/A | N/A | N/A |
| 29 | P3 | 13 | 3.20 | 110 | 10% H2SO4 | 4.2 | 20 | H2O | 1.67 | 80 | 58 | 0.5 | N/A | N/A | N/A | N/A |
| 30 | P3 | 13 | 3.20 | 110 | 10% H2SO4 | 4.2 | 20 | H2O | NA | 80 | 58 | 0.5 | N/A | N/A | N/A | N/A |
| 31 | P3 | 13 | 0.24 | 38 | Glacial Acetic | 4.2 | 24 | NA | NA | NA | 28 | 0.7 | N/A | N/A | N/A | N/A |

NA = Not Applicable
N/A = Not Available

Examples 5-11

Preparation of Polymer P2

Poly(α(1→3) glucan) polymer was synthesized, washed, and isolated using the materials and procedures employed for the preparation of Polymer P1 in Example 1 except that 200 ml of the enzyme extract was added to the pH-adjusted sucrose/dextran/boric acid solution instead of 180 ml. Yield: 246.08 grams of white flaky solids.

Mn and Mw were determined as for polymer P1 to be 129,000 and 270,000 respectively.

Example 5

Spinning Solution

A 250 mL wide mouth glass bottle was charged with 18 g of polymer P2 and 225 g of 4.5 wt % sodium hydroxide. $CS_2$, (2.7 g), was then added via syringe. The container was fitted with a cap and a septum through which a polypropylene stirring rod had been fitted. The contents were manually mixed with the stirring rod and then allowed to stand at room temperature overnight. After 72 hours the partially dissolved solution was transferred into a spin cell and piston containing screen packs including 325 mesh stainless steel screens. A piston was fitted over the viscous mixture. The mixture was then pumped back and forth through 13 cycles using a motorized worm gear driven ram into an identically equipped spinning cell coupled head to head with the first cell via a coupler fabricated from ¼ inch stainless steel tubing.

Examples 6-11

Fiber Spinning

The fibers of Examples 6-11 were spun from the spinning solution of Example 5, in the manner of the fibers of Examples 2-4, supra, under the conditions shown in Table 1. In Examples 6-9, the filament was extruded directly into a coagulation bath containing 5% $H_2SO_4$ (aq.). In Example 10, the fiber was extruded directly into a coagulation bath containing glacial acetic acid. In Example 11, into 50/50 acetic acid/water (v/v) Additional length in the coagulation bath was provided by directing the fiber over additional guide pins (8) for a total immersion distance of 3, 4.3, or 4.5 ft. In Examples, 7-11, but not Example 6, upon removal from the coagulation bath the thus coagulated filament was directed through a second bath (11) of methanol at lengths and temperatures indicated in Table 1. The fiber of Example 6 was guided directly to the wind-up. From the second bath, the coagulated fibers of Examples 7-11 were directed to the wind-up, at the wind-up speeds shown in Table 1. The fiber bobbins were soaked as in Examples 2-4.

Physical properties were determined; results are shown in Table 1.

Examples 12-15

Example 12

Spinning Solution

A 250 mL wide mouth glass bottle was charged with 20 g of Polymer P2 and 180 g of 4.5 wt % sodium hydroxide. $CS_2$, (3.0 g), was then added via syringe. The container was fitted with a cap and septum through which a polypropylene stirring rod had been fitted. The contents were manually mixed with the plastic stirrer and then allowed to stand 2 days. The partially dissolved solution was transferred into a 300 mL stainless steel cylinder fitted with 2×100 mesh, 1×325 mesh and 2×20 mesh stainless steel screens. A piston was fitted over the viscous mixture. The mixture was then pumped back and forth through 13 cycles using a motorized worm gear driven ram into an identically equipped spinning cell coupled head to head with the first cell via a coupler fabricated from ¼ inch stainless steel tubing.

Examples 13-15

Fiber Spinning

The fibers of Examples 13-15 were spun from the spinning solution of Example 12 in the manner of the fibers of Examples 2-4, supra, under the conditions shown in Table 1. The fibers were extruded directly into 5% $H_2SO_4$ (aq.) at the temperature indicated in Table 1. The thus coagulated fibers upon removal from the coagulation bath were directed to the wind-up at wind-up speeds shown in Table 1. The coagulated fibers of Examples 14 and 15 were first passed through the second bath, as indicated in Table 1. The fiber bobbins were soaked and dried as in Examples 2-4.

Physical properties were determined; results are shown in Table 1.

Example 16

Preparation of Polymer P3

Poly(α(1→3) glucan) polymer was synthesized, washed, and isolated using the materials and procedures employed for the preparation of Polymer P1 in Example 1 except that 200 ml of the enzyme extract was added to the pH-adjusted sucrose/dextran/boric acid solution instead of 180 ml. Yield: 228.52 grams of white flaky solids. $M_n$ was 132,000 Daltons; $M_w$ was 301,000 Daltons.

Example 16

Spinning Solution

A 250 mL wide mouth glass bottle was charged with 18 g of polymer P3 and 225 g of 4.5 wt % sodium hydroxide. The container was fitted with a cap and a septum through which a polypropylene stirring rod had been fitted. The contents were manually mixed with the stirring rod and then allowed to stand at room temperature overnight. $CS_2$, (5.4 g), was then added via syringe the following morning. After the addition of $CS_2$ the partially dissolved solution was immediately transferred into a spin cell and piston containing screen packs including 325 mesh stainless steel screens. A piston was fitted over the viscous mixture. The mixture was then pumped back and forth through 13 cycles using a motorized worm gear driven ram into an identically equipped spinning cell coupled head to head with the first cell via a coupler fabricated from ¼ inch stainless steel tubing.

Examples 17-23

Fiber Spinning

Table 1 gives the spinning conditions that were used for the fibers prepared in Examples 17-23. The apparatus depicted in FIG. 1, as described supra, was modified by removal of the driven roll, 10, from the filament pathway. Spin stretch was attained by running the windup faster than the jet velocity. The spinning solution thus prepared was metered at the rates shown in Table 1 through a spin pack having a filter assembly consisting of 100 and 325 mesh stainless steel screens to a 20-hole spinneret having 0.003 inch diameter and 0.006 inch length holes. The filament was extruded directly into 5% $H_2SO_4$ for Examples 17-19 and 10% $H_2SO_4$ for Examples 20-23 at the coagulation bath temperature shown in Table 1. Upon removal from the coagulation bath the thus coagulated filament was directed through a second bath (11) of methanol at lengths and temperatures shown in Table 1, and thence to the wind-up. The filaments of Examples 17, 20, and 21 were guided directly to the wind-up. The second bath in the case of Example 23 was filled with water. Fiber spinning was completed within 8 hours from the addition of carbon disulfide.

The fiber bobbins were soaked in 5% $NaHCO_3$ for 15 minutes, then soaked in water overnight. The bobbins were then removed and allowed to air dry before being subjected to physical measurements.

Example 24

Spinning Solution

A 250 mL wide mouth glass bottle was charged with 32.9 g of polymer P3 and 220 g of 5 wt % sodium hydroxide. The container was fitted with a cap and a septum through which a polypropylene stirring rod had been fitted. The contents were manually mixed with the stirring rod and then allowed to stand at room temperature overnight. $CS_2$, (9.9 g), was then added via syringe the following morning. After the addition of $CS_2$ the partially dissolved solution was immediately transferred into a spin cell and piston containing screen packs including 325 mesh stainless steel screens. A piston was fitted over the viscous mixture. The mixture was then pumped back and forth through 11 cycles using a motorized worm gear driven ram into an identically equipped spinning cell coupled head to head with the first cell via a coupler fabricated from ¼ inch stainless steel tubing.

Examples 25-31

Fiber Spinning

Table 1 gives the spinning conditions that were used for the fibers prepared in Examples 25-31. The apparatus depicted in FIG. 1, as described supra, was modified by removal of the driven roll, 10, from the filament pathway for Examples 25-27. Spin stretch was attained by running the windup faster than the jet velocity. The spinning solution thus prepared was metered at the rates shown in Table 1 through a spin pack having a filter assembly consisting of 100 and 325 mesh stainless steel screens to a 20-hole spinneret having 0.003 inch diameter and 0.006 inch length holes. The filament was extruded directly into 10% $H_2SO_4$ for Examples 25-30 and glacial acetic acid for Example 31 at the coagulation bath temperature shown in Table 1. Upon removal from the coagulation bath the thus coagulated filaments of Examples 26, 27, and 30 were directed through a second bath (11) of water at lengths and temperatures shown in Table 1, and thence to the wind-up. The filaments of Examples 25, 28, 29, and 31 were guided directly to the wind-up and were not passed through the second bath. Fiber spinning was completed within 8 hours from the addition of carbon disulfide to the spinning solution.

The fiber bobbins were soaked in 5% $NaHCO_3$ overnight, and then soaked in water for an additional day. The bobbins were then removed and allowed to air dry before being subjected to physical measurements.

Examples 32-44, and Comparative Examples A-W 36 solutions were prepared to define the solution parameters that resulted in solutions suitable for fiber spinning. For each of Examples 32-44 and Comparative Examples A-W, 40 ml glass vials were charged with the aqueous alkali metal hydroxide shown in Table 2. The concentration of the alkali metal hydroxide solution, in weight-%, and the quantity of that alkali metal hydroxide solution are also shown in Table 2. 2 g of Polymer P1 was then added to each vial. Carbon disulfide ($CS_2$) was added in the amount shown in Table 2 and the vial was fitted with a septum through which a polypropylene stirring rod had been fitted. The contents were manually mixed with the plastic stirrer and were allowed to stand at room temperature for at least 12 hours with intermittent mixing. The solubility designations in Table 2 were determined by visual inspection. A clear solution was considered completely dissolved; a clear solution with some small particles floating around was also considered to be dissolved; since it was considered, that the partially dissolved solutions could be driven to complete dissolution with more intensive mixing. A turbid solution with large undissolved particles was considered to be undissolved.

TABLE 2

| Example # | [NaOH] | NaOH Solution Weight (g) | $CS_2$ (g) | Glucan Solids (%) | Solubility |
|---|---|---|---|---|---|
| 32 | 4.5 wt % | 25.00 | 1.8 | 6.94 | Sol |
| 33 | 4.5 wt % | 18.00 | 1.8 | 9.17 | Sol |
| 34 | 4.5 wt % | 14.75 | 1.8 | 10.78 | Sol |
| 35 | 4.5 wt % | 25.00 | 0.6 | 7.25 | Sol |
| 36 | 4.5 wt % | 18.00 | 0.6 | 9.71 | Sol |
| 37 | 4.5 wt % | 14.75 | 0.6 | 11.53 | Sol |
| 38 | 4.5 wt % | 25.00 | 0.3 | 7.33 | Sol |
| 39 | 4.5 wt % | 18.00 | 0.3 | 9.85 | Sol |
| 40 | 4.5 wt % | 14.75 | 0.3 | 11.73 | Sol |
| 41 | 5 wt % | 25.00 | 1.8 | 6.94 | Sol |
| Comp. Ex. A | 5 wt % | 18.00 | 1.8 | 9.17 | Ins |
| Comp. Ex. B | 5 wt % | 14.75 | 1.8 | 10.78 | Ins |
| 42 | 5 wt % | 25.00 | 0.6 | 7.25 | Sol |
| Comp. Ex. C | 5 wt % | 18.00 | 0.6 | 9.71 | Ins |
| Comp. Ex. D | 5 wt % | 14.75 | 0.6 | 11.53 | Ins |
| 43 | 5 wt % | 25.00 | 0.3 | 7.33 | Sol |
| 44 | 5 wt % | 18.00 | 0.3 | 9.85 | Sol |
| Comp. Ex. E | 5 wt % | 14.75 | 0.3 | 11.73 | Ins |
| Comp. Ex. F | 6 wt % | 25.00 | 1.8 | 6.94 | Ins |
| Comp. Ex. G | 6 wt % | 18.00 | 1.8 | 9.17 | Ins |
| Comp. Ex. H | 6 wt % | 14.75 | 1.8 | 10.78 | Ins |
| Comp. Ex. I | 6 wt % | 25.00 | 0.6 | 7.25 | Ins |
| Comp. Ex. J | 6 wt % | 18.00 | 0.6 | 9.71 | Ins |
| Comp. Ex. K | 6 wt % | 14.75 | 0.6 | 11.53 | Ins |
| Comp. Ex. L | 6 wt % | 25.00 | 0.3 | 7.33 | Ins |
| Comp. Ex. M | 6 wt % | 18.00 | 0.3 | 9.85 | Ins |
| Comp. Ex. N | 6 wt % | 14.75 | 0.3 | 11.73 | Ins |
| Comp. Ex. O | 7.5 wt % | 25.00 | 1.8 | 6.94 | Ins |
| Comp. Ex. P | 7.5 wt % | 18.00 | 1.8 | 9.17 | Ins |
| Comp. Ex. Q | 7.5 wt % | 14.75 | 1.8 | 10.78 | Ins |
| Comp. Ex. R | 7.5 wt % | 25.00 | 0.6 | 7.25 | Ins |
| Comp. Ex. S | 7.5 wt % | 18.00 | 0.6 | 9.71 | Ins |
| Comp. Ex. T | 7.5 wt % | 14.75 | 0.6 | 11.53 | Ins |
| Comp. Ex. U | 7.5 wt % | 25.00 | 0.3 | 7.33 | Ins |

TABLE 2-continued

| Example # | [NaOH] | NaOH Solution Weight (g) | $CS_2$ (g) | Glucan Solids (%) | Solubility |
|---|---|---|---|---|---|
| Comp. Ex. V | 7.5 wt % | 18.00 | 0.3 | 9.85 | Ins |
| Comp. Ex. W | 7.5 wt % | 14.75 | 0.3 | 11.73 | Ins |

Example 45

Determination of Glucan Xanthate Formation and Decomposition Using NMR Spectroscopy 2 g of poly($\alpha$(1→3) glucan) were dissolved in 25 ml of aqueous sodium hydroxide (4.5 wt-%). After dissolution was complete, 0.6 g of carbon disulfide was added and the mixture so formed was then stirred mechanically and immediately transferred, using a syringe and needle, into a special 4.1 mm OD sample tube sold by New Era Enterprises, Inc. The tube was capped and lowered into a standard 7 inch, 5 mm NMR tube which contained 604 of D20 as an NMR lock solvent. These concentric tubes were placed in a small, bench-top centrifuge and spun for several minutes to bring the sample to the bottom of the inner tube and to eliminate all air bubbles from the sample. The NMR tubes were removed from the centrifuge and placed in the magnet of a Bruker 500 MHz Avance II Spectrometer equipped with a 5 mm CPDUL cryoprobe having z gradients. The probe was tuned and the magnet was shimmed before starting a series of consecutive experiments to investigate the formation and degradation of poly($\alpha$(1→3) glucan). Each experiment was acquired using the Bruker zgig pulse sequence with a spectral width of 33333.3 Hz (265.0 ppm), a transmitter offset of 160 ppm, and 32768 time domain points for an acquisition time of 0.4916 sec. A 3 sec. delay was used between pulses and 3000 scans were acquired for each experiment, giving a total time of 2 hours and 56 minutes for each experiment.

In order to suppress a baseline roll and obtain better peak integrals, the digital data from each experiment was converted to analog data so that backward linear prediction could be performed. The first 12 points of each data set were replaced using Bruker's linear prediction data processing based on the first 1024 data points. The Free Induction Decay was also multiplied by a 2.0 Hz exponential function before being transformed. In order to determine the degree of xanthate substitution the integral area for the xanthate carbon, centered at 232.5 ppm, was compared to the integral area (set to 1.00) for the glucan C1 anomeric carbons at 95.6-100.9 ppm, used as an internal calibration. At no point in this series of experiments was a signal for the $^{13}C$ of free $CS_2$ (193.7 ppm) observed whereas signals for sodium trithiocarbonate (269.4 ppm) and sodium carbonate (168.4 ppm) were present as by products of the degradation of glucan xanthate over time. Results are shown in Table 3.

TABLE 3

| Elapsed Time (hrs.) | Degree of Xanthation |
|---|---|
| 0 | 0.64 (est.) |
| 3 | 0.61 |
| 6 | 0.52 |
| 12 | 0.43 |
| 24 | 0.23 |
| 36 | 0.15 |
| 54 | 0.04 |

I claim:

1. A process comprising forming a solution by dissolving in a 0.75 to 2 molar aqueous alkali metal hydroxide, $CS_2$, and 5 to 15 percent by weight of the total weight of the resulting solution of poly($\alpha$(1→3) glucan) characterized by a number average molecular weight of at least 10,000 Da, causing said solution to flow through a spinneret, forming a fiber thereby; and contacting said fiber with an acidic liquid coagulant; wherein said process the weight ratio of $CS_2$ to poly($\alpha$(1→3) glucan) lies in the range of 0.1 to 1.0.

2. The process of claim 1 wherein 7.5 to 15 percent by weight of poly($\alpha$(1→3) glucan) is dissolved in said solution.

3. The process of claim 1 wherein the alkali metal hydroxide is NaOH.

4. The process of claim 1 wherein the concentration of NaOH is 1.0 to 1.7 molar.

5. The process of claim 1 wherein the poly($\alpha$(1→3) glucan) 100% of the repeat units are glucose, and 100% of the linkages between repeat units are $\alpha$(1→3) glycoside linkages.

6. The process of claim 1 further comprising allowing the solution to stand for a period of 1 to 8 hours prior to spinning.

7. The process of claim 1 wherein the poly($\alpha$(1→3) glucan) is characterized by a number average molecular weight in the range of 40,000-100,000 Daltons.

8. The process of claim 1 wherein the $CS_2$ is added last.

* * * * *